United States Patent
Cordell et al.

(10) Patent No.: US 8,615,791 B1
(45) Date of Patent: Dec. 24, 2013

(54) MULTI-DOMAIN LOGIN AND MESSAGING

(75) Inventors: Jeffrey William Cordell, Omaha, NE (US); Larry Trent Larson, Bennington, NE (US); Michael S Fecci, Omaha, NE (US); Raymond Onslow Morris, Omaha, NE (US); Kevin Peter Pierson, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

(21) Appl. No.: 13/373,598

(22) Filed: Nov. 21, 2011

Related U.S. Application Data (63) Continuation of application No. 11/942,758, filed on Nov. 20, 2007, now Pat. No. 8,079,066.

(51) Int. Cl.
*H04L 29/06* (2006.01)
*G06F 7/04* (2006.01)
*G06F 15/16* (2006.01)
*G06F 17/30* (2006.01)
*G06F 21/00* (2013.01)

(52) U.S. Cl.
USPC ........ 726/5; 726/6; 726/12; 726/28; 713/150; 713/153; 713/182; 713/183

(58) Field of Classification Search
None
See application file for complete search history.

(56) References Cited

U.S. PATENT DOCUMENTS

| | | | |
|---|---|---|---|
| 3,883,970 A | 5/1975 | Campbell | |
| 4,700,295 A | 10/1987 | Katsof et al. | |
| 4,852,001 A | 7/1989 | Tsushima et al. | |
| 5,053,970 A | 10/1991 | Kurihara et al. | |
| 5,111,391 A | 5/1992 | Fields et al. | |
| 5,124,912 A | 6/1992 | Hotaling et al. | |
| 5,270,920 A | 12/1993 | Pearse et al. | |
| 5,289,368 A | 2/1994 | Jordan et al. | |
| 5,325,292 A | 6/1994 | Crockett | |
| 5,467,268 A | 11/1995 | Sisley et al. | |
| 5,499,291 A | 3/1996 | Kepley | |
| 5,557,515 A | 9/1996 | Abbruzzese et al. | |
| 5,615,121 A | 3/1997 | Babayev et al. | |
| 5,617,342 A | 4/1997 | Elazouni | |
| 5,748,907 A | 5/1998 | Crane | |
| 5,842,182 A | 11/1998 | Bonner et al. | |
| 5,911,134 A | 6/1999 | Castonguay | |
| 5,960,406 A | 9/1999 | Rasansky et al. | |
| 6,115,693 A | 9/2000 | McDonough | |
| 6,178,511 B1 * | 1/2001 | Cohen et al. | 726/6 |
| 6,240,512 B1 * | 5/2001 | Fang et al. | 713/150 |

(Continued)

OTHER PUBLICATIONS

University of Missouri Resources Policy Manual. "Shift Differential Compensation." Sep. 26, 1997. <http://umsystenn.edu/ums/departments/hr/manual/213.shtml>.

(Continued)

*Primary Examiner* — Shin-Hon Chen (57) ABSTRACT

A method, a computer readable medium and a system of multi-domain login and messaging are provided. The method for multi-domain login comprises inputting a local password by an agent, accessing a password vault with the local password, and retrieving at least one hidden password from the password vault, and logging the agent into at least one agent application using the at least one hidden password. The method for multi-domain messaging comprises retrieving information of an agent from a database, retrieving at least one skill group to which the agent belongs from the information, retrieving a message linked to the at least one skill group, and sending the message to the agent.

20 Claims, 9 Drawing Sheets

(56) References Cited

U.S. PATENT DOCUMENTS

| | | | |
|---|---|---|---|
| 6,278,978 B1 | 8/2001 | Andre | |
| 6,320,956 B1 | 11/2001 | Cherry | |
| 6,334,133 B1 | 12/2001 | Thompson et al. | |
| 6,493,446 B1 | 12/2002 | Cherry | |
| 6,587,831 B1 | 7/2003 | O'Brien | |
| 6,662,300 B1 * | 12/2003 | Peters | 713/182 |
| 6,859,878 B1 * | 2/2005 | Kerr et al. | 713/183 |
| 6,912,433 B1 | 6/2005 | Green | |
| 2001/0044893 A1 * | 11/2001 | Skemer | 713/153 |
| 2004/0039945 A1 * | 2/2004 | Oda | 713/201 |
| 2008/0077982 A1 * | 3/2008 | Hayler et al. | 726/12 |

OTHER PUBLICATIONS

University Professional & Technical Employees Contract. "Article 35: Shift Differential". Jul. 12, 1997. <http://www.upte.org/tx/contract/art35shiftdif.html>.

RN, "Index of Employers (Hospital Profiles) (Nursing Opportunities Supplement)". Jan. 1988.

"Security System Minimises Baggage". Feb. 2, 1995. Business Computing Brief.

University of California Human Resources and Benefits Department. "Personnel Policies for Staff Members". Jul. 1, 1996. <http://atyourservice.ucop.edu/employees/policies/staff_policies/spp33.html>.

University of Texas Health Science Center at Houston. "Shift Differential Pay". Nov. 1998. <http://www.uth.tmc.edu/ut_general/admin_fin/planning/pub/hoop/05/5_07.html>.

University of Houston Manual of Administrative Policies and Procedures. "Shift Differential Pay". Aug. 22, 1996. <http://www.uh.edu/mapp/02/020105pro.htm>.

Allimadi, Milton, "Workforce Management Systems Response to Challenges with more Sophisticated Products". Call Center Magazine. Apr. 1999. pp. 82-92.

Brown, Dartanyan L., "TeamAgenda Puts Groups on Schedule". MacWeek, v5, n40, p. 8 (10, Nov. 19, 1991).

Higgings, Steve, "MediaWorks Offers Mac Work-Group Program". PC Week, v8 n24, p. 85(1), Oct. 21, 1991.

Durr, Bill, "Inbound Scheduling Nightmares: Cursing the Darkness or Lighting a Candle". Telemarketing Magazine, v.12, n7, pp. 44-48, Jan. 1994.

West Teleservices 1996 Annual Report, 1997, p. 5, United States.
West Teleservices 1997 Annual Report, 1998, p. 6, United States.
West Teleservices 1998 Annual Report, 1999, pp. 6-7, United States.
West Teleservices 1999 Annual Report, 2000, p. 3, United States.

Hunt, Brooks, "$99.95 Staff Scheduler With Smarts Covers Your Tasks". PC Magazine, v8, n9, pp. 54(1), May 16, 1989.

* cited by examiner

Figure 9

MULTI-DOMAIN LOGIN AND MESSAGING

CROSS REFERENCE TO RELATED APPLICATIONS

The present application is a continuation of U.S. Ser. No. 11/942,758 entitled MULTI-DOMAIN LOGIN AND MESSAGING, filed on Nov. 20, 2007, the entire contents of which are incorporated by reference herein. The present application is related to commonly assigned U.S. Ser. No. 11/565,680 entitled MAINTAINING A WORK SCHEDULE, filed on Dec. 1, 2006, U.S. Ser. No. 11/565,679 entitled DYNAMICALLY ALLOCATING A WORK SCHEDULE, filed on Dec. 1, 2006, U.S. Ser. No. 11/565,677 entitled OFFERING UPTIME ADJUSTMENTS TO A WORK SCHEDULE, filed on Dec. 1, 2006, U.S. Ser. No. 11/565,676 entitled PROPOSING DOWNTIME ADJUSTMENTS TO A WORK SCHEDULE, filed on Dec. 1, 2006, and U.S. Ser. No. 11/565,681 entitled EVENT BASED FORECASTING A WORK SCHEDULE, filed on Dec. 1, 2006, the entire contents of which are incorporated by reference herein.

The present application is also related to commonly assigned U.S. Ser. No. 11/942,760 MULTI-DOMAIN LOGIN MESSAGING AND PRESENCE REGISTRATION, filed on Nov. 20, 2007 and U.S. Ser. No. 11/942,759 entitled MAINTAINING PER-SEAT LICENSING ACROSS MULTIPLE HOME AGENTS, filed on Nov. 20, 2007, the entire contents of which are incorporated by reference herein.

FIELD OF THE DISCLOSURE

The present disclosure relates generally to an improved multiple domain login procedure and messaging. Still more particularly, the present disclosure provides a method, a system, and a computer readable medium comprising instructions for automated multi-domain login and messaging.

BACKGROUND OF THE DISCLOSURE

Historically, management and communications with a large employee workforce has been a complex and time-consuming task. With regard to managing large groups of employees, it is difficult to predict which applications they will need access to or data from or what employee preferences would be from day to day. Additionally, appropriate and timely communication with a set of workers can be time consuming and difficult.

A password is a form of secret authentication data that is used to control access to a resource. The password is kept secret from those not allowed access, and those wishing to gain access are tested on whether or not they know the password and are granted or denied access accordingly. Keeping track of multiple passwords to multiple resources is time consuming and prone to error.

The current state of the art for login of employees to multiple domains, applications and environments is to have the employee individually login to each required system. A need was felt for an automated login that would manage a set of hidden passwords for a number of applications and allow a user to access those password protected resources utilizing one local password. Communications to groups consist of group communications for each group that the employee or employer places the worker in. A need was additionally felt for directed communications to the multiple applications that were accessed by the user.

A major deficiency in the current state of the art for login systems is that the login requires multiple interactions by the employee and the applications can change with respect to time and employee preference. A major deficiency with the current state of the art for login messaging is that the system is either static or requires input by the employee or employer for updated group ids. Neither the messaging nor the login system keeps track of the employee preferences and both require manual update to function properly.

Another major deficiency of current state of the art is the ability to provide supervisors availabilities of agents who may not have the right skills but are interested in performing a task. With regard to managing large groups of employees, in particular remote employees, it is difficult to monitor availabilities of each employee and skills set possessed by each of the employees, let alone those who are interested in performing the task. It is also difficult to provide alerts to supervisors of employees when the availability of employees for a particular task is below a certain threshold.

Therefore, what is needed is a multi-domain login and messaging solution that overcomes the manual input limitations currently experienced. This solution allows multiple domains to be logged into automatically, determines agent data and automatically finds pertinent message traffic to route to the agent. In addition, a need exists for a multi-domain presence registration of multiple agents regardless whether the agents possess skill sets that are required by the task and provide alerts to supervisors when the need for more agents arises.

SUMMARY OF THE DISCLOSURE

A method for multi-domain login is provided. A local password is inputted by an agent. A password vault is accessed with the local password. At least one hidden password is retrieved from the password vault. The agent is logged into at least one agent application using the at least one hidden password.

A method for multi-domain messaging is provided. Information of an agent is retrieved from a database. At least one skill group to which the agent belongs is retrieved from the information. A message linked to the at least one skill group is retrieved. The message is sent to the agent. In addition, the agent is subscribed to the at least one skill group based on a skill set possessed by the agent. The at least one skill group of the agent is stored in the database.

In another embodiment of the present disclosure, at least one skill group required for a task is located. At least one agent belonging to the at least one skill group is located. A message pertinent to the at least one skill group is retrieved. The message pertinent is then sent to the at least one agent.

A system for multi-domain login and messaging is provided. The system comprises at least one agent utilizing at least one system, a communication server communicably coupled to the at least one system, a database communicably coupled to the communication server, an application communicably coupled to the communication server and the database, the application comprising a password vault, and at least one agent application communicably coupled to the application, the application is operable to login the at least one agent into the at least one agent application utilizing at least one hidden password in the password vault, retrieve information of the at least one agent from the database, retrieve at least one skill group to which the at least one agent belongs from the information, retrieve a message linked to the at least one skill group, and send the message to the at least one agent.

DETAILED DESCRIPTION OF THE INVENTION

Figure 1:
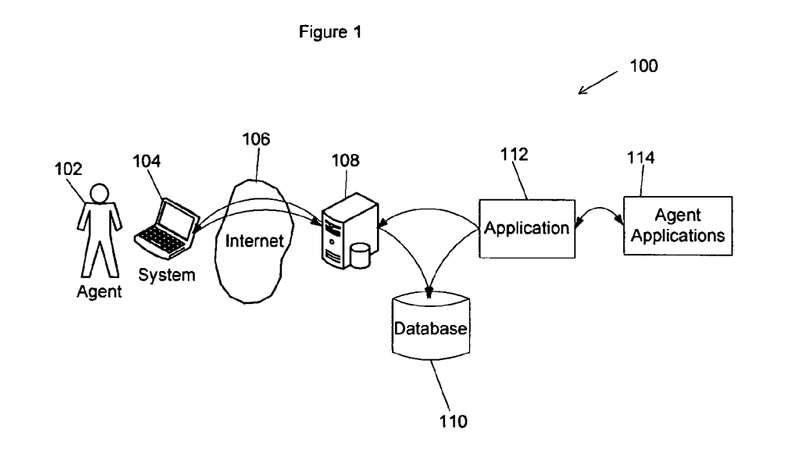
FIG. 1 depicts a system for multi-domain login and messaging in accordance with an embodiment of the disclosure.

With reference to the figures and in particular with reference to FIG. 1, a diagram of a system for multi domain login and messaging is depicted in accordance with an embodiment of the disclosure. The agent 102 interacts with a system 104 that is communicably coupled through the internet 106 to the live communication server 108. System 104 may be a data processing system, such as a desktop computer, a laptop computer, an Internet protocol-enabled device, such as an IP-enabled telephone, or any other type of device capable of sending and receive information via a wired or wireless protocol. The communication server 108 is communicably coupled to a database 110 in which agent information is stored. The communication server 108 also communicates with application 112, which authenticates and registers agents with the database 110. The application 112 also communicates with other agent applications 112. Application 112 determines if there is an appropriate message for the agent from agent applications 114. If an appropriate message is found, the message is initiated by application 112 and is sent to the live communications server 108. The live communications server 108 then forwards the message to system 104, which is then delivered to agent 102. The transfer of information between system 104, communication server 108, application 112, database 110, and agent applications 114, may be accomplished via at least one of a wireless protocol, a wired protocol and a combination of a wireless protocol and a wired protocol. The steps performed in this figure are performed by software, hardware, firmware, and/or the combination of software, hardware, and/or firmware.

Figure 2:
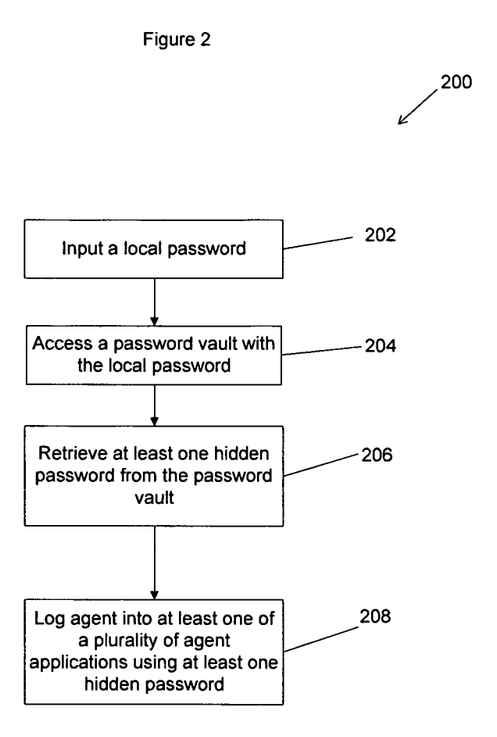
FIG. 2 depicts a flowchart of a process for multi-domain login in accordance with an embodiment of the disclosure.

To authenticate and register agents with database 110, one aspect of the present disclosure provides a method for multi-domain login, such that the agent may automatically be logged into agent applications without manually inputting each individual password. With reference now to FIG. 2, a flowchart of a process for multi-domain login is depicted in accordance with an embodiment of the disclosure. In this embodiment, process 200 may be implemented as instructions embodied in a computer readable medium executing within system 104 by a software application, such as application 112.

Process 200 begins with step 202 to input a local password. The local password may be a password specified by the agent for application 112 or a host name of system 104. Process 200 then continues to step 204 to access a password vault with the local password. The password vault may include a plurality of hidden passwords that are used to log the agent into a plurality of agent applications, such as agent applications 114. Process 200 then continues to step 206 to retrieve at least one hidden password from the password vault. Process 200 then completes at step 208 to log the agent into at least one of the plurality of agent applications using the at least one hidden password. In this way, the agent does not have to individually input the password for each of the agent applications.

It is noted that in addition to utilizing password vault and hidden password to authenticate agents against multiple domains, authentication may be performed based on licensed seat name available at the time the agent logs into the application. By utilizing licensed seat name to authenticate agents, per-seat licensing may be achieved. Per-seat licensing provides a specific number of licenses for a period of time, which may be shared among a number of agents who are performing their tasks. Per-seat licensing is preferred over per-user licensing, which provides a license to each agent, because it is more cost effective. More details regarding utilizing available license seat name available to authenticate agents are discussed with reference to cross related patent application Ser. No. 11/942,759, entitled MAINTAINING PER-SEAT LICENSING ACROSS MULTIPLE HOME AGENTS, which is incorporated by reference above.

Once the agent is logged into agent applications, another aspect of the present disclosure provides a method for multi-domain messaging, such that agents may receive appropriate message from the agent applications based on a skill group to which the agent belongs. The process in which an agent is matched against a task is referred to as certification. In certification, a set of skills possessed by the agent are matched against a set of skills required by a particular task. For example, to perform a task for taking orders for a particular retailer, the agent must complete a certain number of training courses about the products that the retailer offers. If the agent satisfies the training requirements, the agent is certified to perform that task and is assigned a skilled group for that retailer. A task may require more than one skill group.

Figure 3:
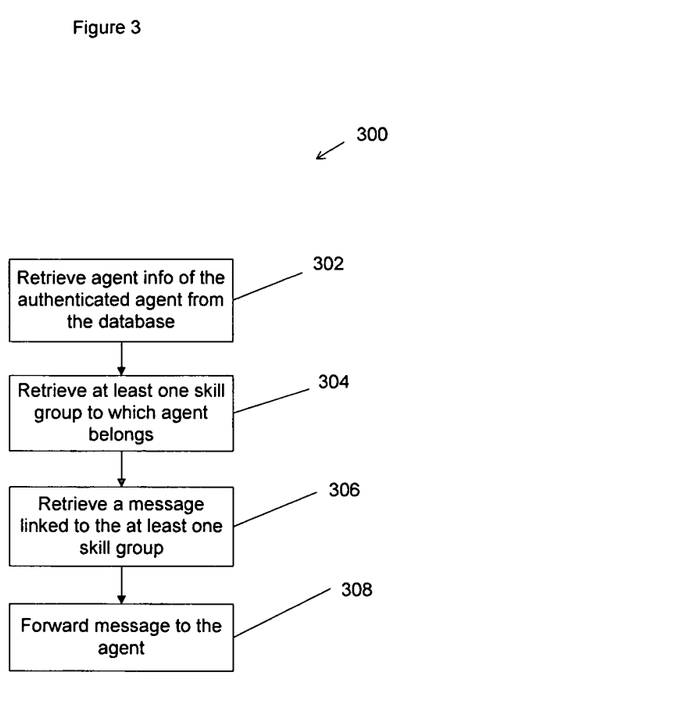
FIG. 3 depicts a flowchart of a process for multi-domain messaging in accordance with an embodiment of the disclosure.

With reference now to FIG. 3, a flowchart of a process for multi-domain messaging is depicted in accordance with an embodiment of the disclosure. In this embodiment, process 300 may be implemented as instructions embodied in a computer readable medium executing within system 104 by a software application, such as application 112. Process 300 begins at step 302 to retrieve agent information of the authenticated agent from the database. The agent information may include the set of skills possessed by the agent and skill groups to which the agent currently belongs to. Process 300 then continues to step 304 to retrieve at least one skill group to which the agent belongs based on the skill set of the agent. Process 300 then continues to step 306 to retrieve at least one message linked to the at least one skill group from the agent application. The message may include information about the task to be performed by the agent. For example, the message may include notification to agents that new products have become available for a task, new training is required for a task, new schedule a task has become available, additional information about other products offered by a task, or an urgent need for an agent is available for a task. In addition, the message may include notification of best agents for the task, reminders of a task, or any other information related to a task. By linking messages to skill groups, customized messages may be sent to the agent based on the skill set the agent possesses. Process 300 then completes at step 308 to forward the message to the agent.

Figure 4:
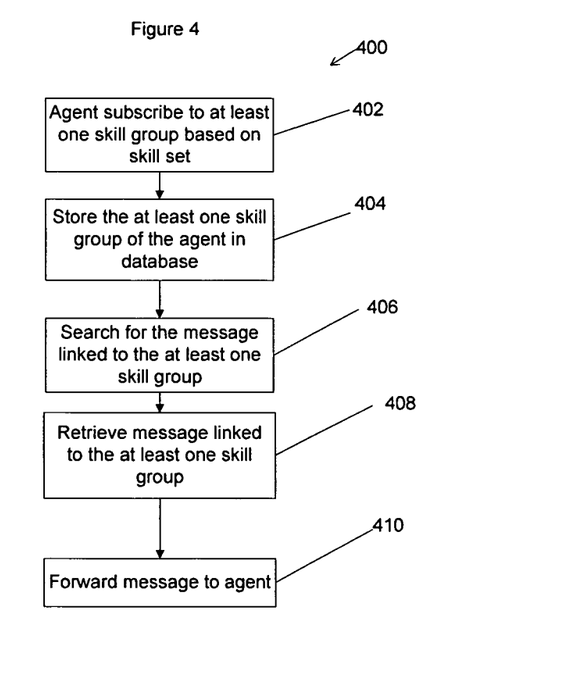
FIG. 4 depicts a flowchart of a process for multi-domain messaging in accordance with an alternative embodiment of the present disclosure.

Sometimes, agents may subscribe to perform a new task based on their skill sets. In addition to skill groups which agents already belong, agents may subscribe to new skill groups required by the task based on their skill sets and receive messages from the skill groups. Referring now to FIG. 4, a flowchart of a process for multi-domain messaging is depicted in accordance with an alternative embodiment of the present disclosure. In this embodiment, process 400 may be implemented as instructions embodied in a computer readable medium executing within system 104 by a software application, such as application 112. Process 400 begins with step 402 when an agent subscribes to at least one skill group based on a set of skills the agent possesses. For example, an agent may be interested in subscribing to a retailer that sells medical devices, because the agent possesses training required for selling medical products.

Process 400 then continues to step 404 to store the at least one skill group subscribed by the agent in the database. Once the at least one skill group is subscribed, process 400 continues to step 406 to search for at least one message that is linked to the at least one skill group subscribed by the agent. Process 400 then continues to step 408 to retrieve the message linked to the at least one skill group from the agent application. Process 400 then completes at step 410 to forward the message to the agent. In this way, not only are agents able to receive messages from skill groups that they already subscribed, agents are also able to subscribe new skill groups based on their skill sets and to receive messages from the new skill groups in order to perform their tasks.

Figure 5:
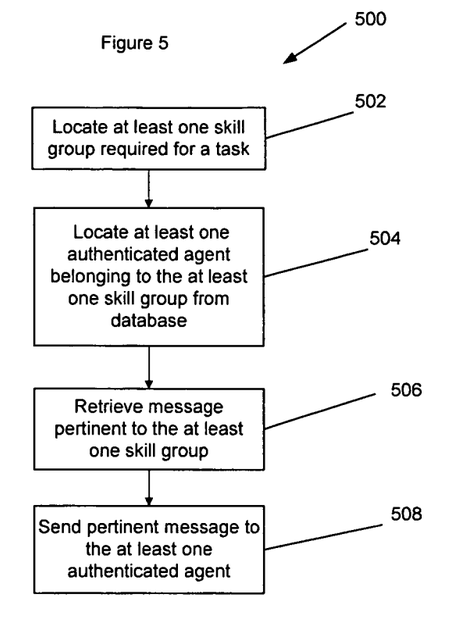
FIG. 5 depicts a flowchart of a process for multi-domain messaging in accordance with yet another embodiment of the present disclosure.

In addition to retrieving messages linked to agents based on their skill sets, another aspect of the present disclosure provides a method for broadcasting messages to agents that belong to a skill group. For example, an urgent need may exist for authenticated agents for a particular task. Messages may be sent to agents that possessed the set of skills required by the task by broadcasting messages to agents belonging to a particular skill group. Referring now to FIG. 5, a flowchart of a process for multi-domain messaging is depicted in accordance with yet another embodiment of the present disclosure. In this embodiment, process 500 may be implemented as instructions embodied in a computer readable medium executing within system 104 by a software application, such as application 112.

Process 500 begins at step 502 to locate at least one skill group required for a task. For example, a skill group that includes a plurality of training requirements for selling medical devices. Process 500 then continues to step 504 to locate at least one authenticated agent belonging to the at least one skill group from the database. Since the database comprises information including skill sets of agents and skill groups which the agents have subscribed, a look up may be performed in the database to determine which authenticated agent possessed the required skill sets and subscribed to the at least one skill group. Process 500 then continues to step 506 to retrieve messages pertinent to the at least one skill group from the agent application. Process 500 then completes at step 508 to send pertinent messages to the at least one authenticated agent belonging to the at least one skill group. In this way, messages may be broadcasted to authenticated agents belonging to at least one skill group.

In addition to sending agents of messages specific to their skill groups, another aspect of present disclosure provides messages customized for the particular agent. For example, a message may be sent to the agent regarding new schedules available to the agent. A message may also be sent to the agent regarding pay or performance data of the agent. A message may also be sent to the agent to continue training or review refresher material regarding skills already possessed by the agent. Since the agent may be paid based on the time required to set up for a task, an aspect of the present disclosure also provides training material directly to the agent prior to performing a specific task to refresh the agent. The training material may be delivered via various formats, including messages, streaming videos, or a series of web pages.

Figure 6:
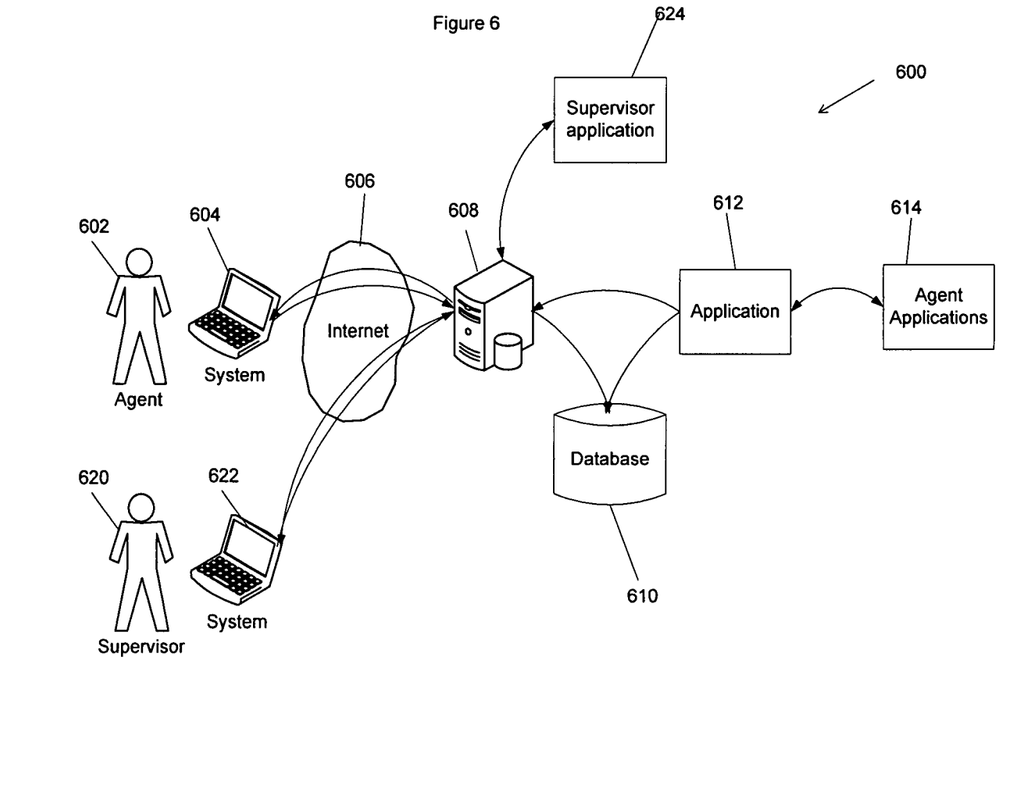
FIG. 6 depicts a diagram of a system for registering presence of multiple agents in accordance with an embodiment of the present disclosure.

In addition to messages to agents, another aspect of the present disclosure provides agent supervisors capability to initiate messages to agents based on the availability of the agents. In order to detect availability of agents, another aspect of the present disclosure detects presence of agents upon authentication and registers their presence. Referring to FIG. 6, a diagram of a system 600 for registering presence of multiple agents is depicted in accordance with an embodiment of the present disclosure. System 600 is similar to system 100 depicted in FIG. 1, except that supervisor 620 interacts with a system 622 that is communicably coupled through the interne 606 to the live communication server 608. System 622 may be a data processing system, such as a desktop computer, a laptop computer, an Internet protocol-enabled device, such as an IP-enabled telephone, or any other type of device capable of sending and receive information via a wired or wireless protocol. In addition to database 610 and application 612, the communication server 608 also communicates with supervisor application 624, which monitors and registers presence of multiple agents. The supervisor application 624 provides indicators of agents' presence and availabilities for each of tasks assigned. Upon determination that more agents are required for a particular task, the supervisor may initiate messages to alert agents having a skill set required by the task that an opportunity is available to perform the task. The transfer of information between system 622, communication server 608, application 612, database 610, agent applications 614, and supervisor application 624, may be accomplished via at least one of a wireless protocol, a wired protocol and a combination of a wireless protocol and a wired protocol. The steps performed in this figure are performed by software, hardware, firmware, and/or the combination of software, hardware, and/or firmware.

Figure 7:
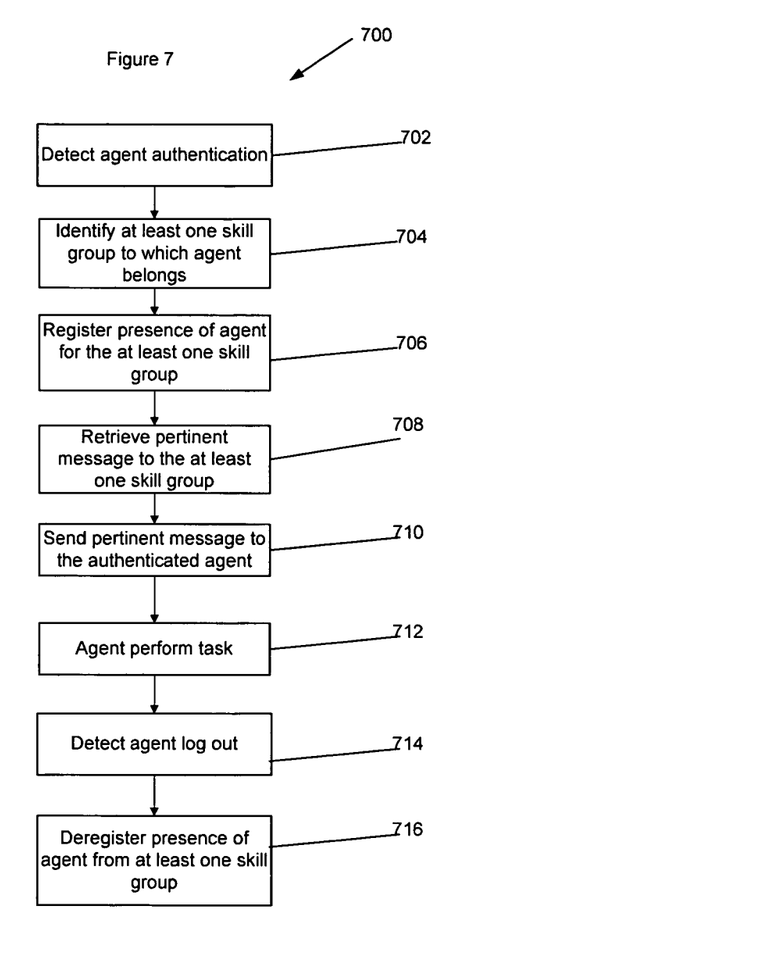
FIG. 7 depicts a flowchart of a process for monitoring and registering presence of agents in accordance with an embodiment of the present disclosure.

Referring to FIG. 7, a flowchart of a process for monitoring and registering presence of agents is depicted in accordance with an embodiment of the present disclosure. In this example, process 700 may be implemented as instructions embodied in a computer readable medium executing within system 620 by a software application, such as supervisor application 624. Process 700 begins at step 702 to detect authentication of agent. The authentication may be detected based on successful multi-domain login accomplished using steps described in process 200 of FIG. 2.

Process 700 then continues to step 704 to identify at least one skill group to which the agent belongs. Upon identification of the at least one skill group, process 700 continues to step 706 to register presence of the agent for the at least one skill group. At this time, the supervisor application may indicate to the supervisor that the agent is available. Process 700 then continues to step 706 to retrieve pertinent messages for the at least one skill group and send the pertinent messages to the authenticated agent at step 710. The agent continues to step 712 to perform a task. At this time, the supervisor application may indicate to the supervisor that the agent is busy. Process 700 then continues to step 714 to detect that the agent logs out of the application. Process 700 then completes at step 716 to deregister presence of the agent from the at least one skill group. At this time, the supervisor application may indicate to the supervisor that the agent is no longer available. It is noted that the indication by the supervisor application to the supervisor may be presented in a number of formats, including the use of instant messages, color, sound, flashing texts, or any other type of communication format.

Figure 8:
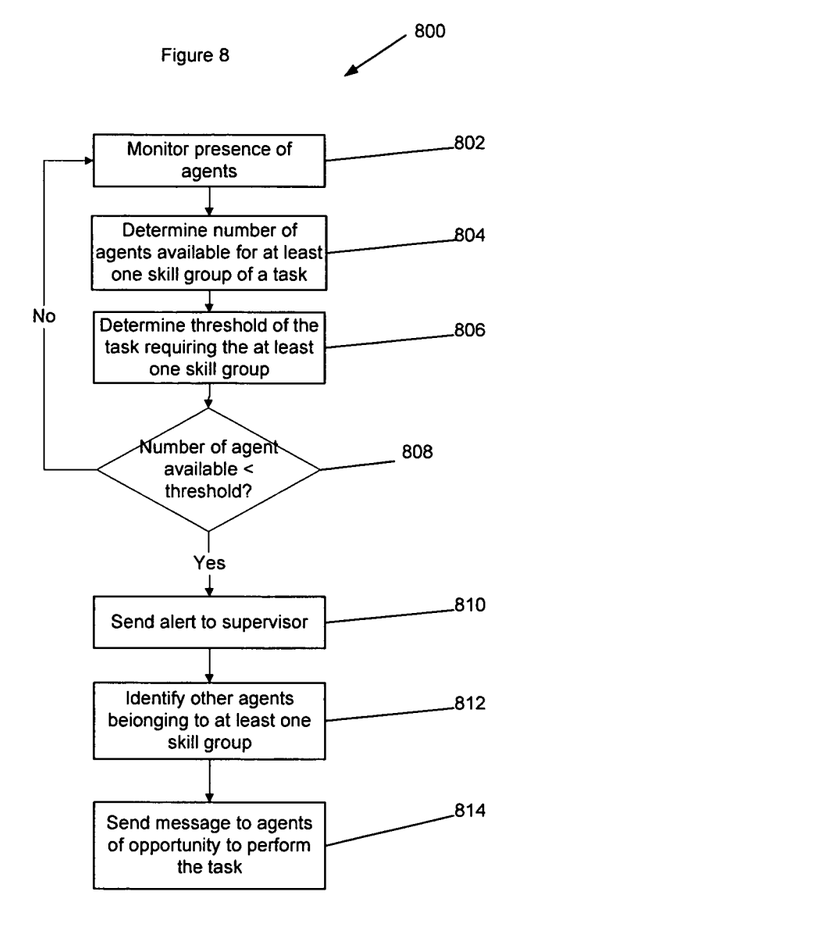
FIG. 8 depicts a flowchart of a process for alerting supervisors based on agents' availabilities in accordance with an embodiment of the present disclosure.

In addition to monitoring and registering presence of agents, another aspect of the present disclosure provides alerts to supervisors if the number of available agents for a particular task falls below a predetermined threshold. Referring to FIG. 8, a flowchart of a process for alerting supervisors based on agents' availabilities is depicted in accordance with an embodiment of the present disclosure. In this example, process 800 may be implemented as instructions embodied in a computer readable medium executing within system 620 by a software application, such as supervisor application 624.

Process 800 begins with step 802 to monitor presence of agents in accordance with steps described in process 700 of FIG. 7. Process 800 then continues to step 804 to determine the number of agents available for at least one skill group required by a task. Process 800 continues to step 806 to determine a predetermined threshold of the task, which is the minimum number of agents required to perform the task. The predetermined threshold may be determined based on various factors, including but not limited to, for example, the number of products being offered by the task, time of day the task is being performed, and the like. Process 800 then continues to step 808 to determine if the number of available agents for the task is less than the predetermined threshold.

If the number of available agents is less than the predetermined threshold, process 800 continues to step 810 to send an alert to the supervisor. It is noted that the alert may be sent by the supervisor application and may be presented in a number of formats, including the use of instant messages, color, sound, flashing texts, or any other type of communication format. If the supervisor wants to alert other agents of the opportunity to perform the task, process 800 continues to step 812 to identify other agents belonging to the at least one skill group required by the task whose presence are not registered. Process 800 then completes at step 814 to send a message to those agents about the opportunity to perform that task.

Alternative to sending messages to agents who belong to the at least one skill group, another aspect of the present disclosure may allow the supervisor to initiate messages to agents who do not possess the required skill set but are interested in performing the task and invite the agents to complete training required for the task. If the agent completes the training required for the task, the agent may subscribe to the at least one skill group required and perform the task.

Figure 9:
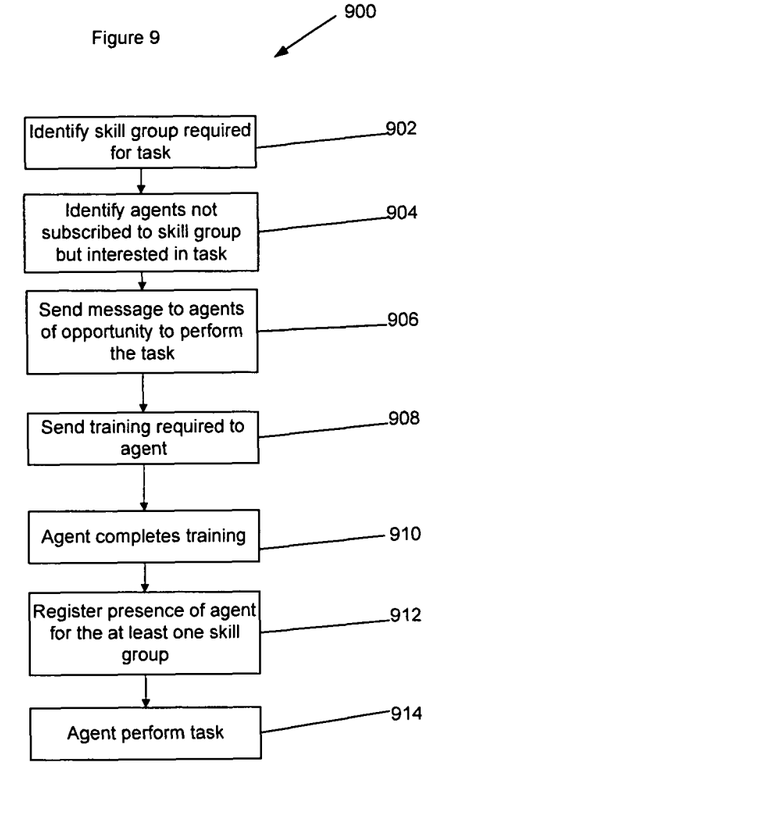
FIG. 9 depicts a flowchart of a process for inviting agents to perform a task in accordance with an embodiment of the present disclosure.

Referring to FIG. 9, a flowchart of a process for inviting agents to perform a task is depicted in accordance with an embodiment of the present disclosure. In this example, process 900 may be implemented as instructions embodied in a computer readable medium executing within system 620 by a software application, such as supervisor application 624. Process 900 begins at step 902 to identify at least one skill group required by the task. Process 900 then continues to step 904 to identify agents who are not subscribed to the at least one skill group required by the task but are interested in performing the task.

Process 900 then continues to send a message to these agents about the opportunity to perform the task. Process 900 then proceeds to step 908 to send training or other material required for the task to the agent who is interested in performing the task. The training material may be delivered via various formats, including messages, streaming videos, or a series of web pages. The agent proceeds to step 910 to complete the training. Upon completion of training, process 900 continues to step 912 to register presence of the agent for the at least one skill group and the agent then completes process 900 at step 914 to perform the task. In this way, even agents who do not possess the skill sets required by the task may complete training or other requirements and subscribe to the skill group to perform the task.

In summary, the present disclosure a method, a system, and computer readable instructions for multi-domain login, messaging and presence registration. Although the above descriptions set forth preferred embodiments, it will be understood that there is no intent to limit the embodiment of the disclosure by such disclosure, but rather, it is intended to cover all modifications, substitutions, and alternate implementations falling within the spirit and scope of the embodiment of the disclosure. The embodiments are intended to cover capabilities and concepts whether they be via a loosely coupled set of components or they be converged into one or more integrated components, devices, circuits, and/or software programs.

What is claimed is:

1. A method, comprising:
inputting a local password by an agent;
accessing a password vault with the local password;
retrieving at least one hidden password from the password vault; and
determining a message for the agent from at least one agent application based on a subscription of the agent to at least one skill group wherein subscription is based on a matching of a skill set of the agent against a set of skills required by at least one task assigned to the skill group and wherein the message is associated with the at least one task wherein one of in addition to and alternative to utilizing the password vault and the at least one hidden password to authenticate the agent, authentication is performed based on licensed available seat name.

2. The method of claim 1, wherein the message comprises at least one of a message indicating a new product has become available for the at least one task, a message indicating a new training is required for the at least one task, a message indicating a new schedule for the at least one task has become available, a message indicating additional information about the at least one task, and an urgent need for an agent is available for the at least one task.

3. The method of claim 1, further comprising:
storing the at least one skill group of the agent in a database.

4. The method of claim 3, wherein the database further stores information of an agent comprising the set of skills possessed by the agent and at least one skill group to which the agent belongs.

5. The method of claim 1, further comprising:
locating at least one skill group required for a task;
locating at least one agent belonging to the at least one skill group;
retrieving a message pertinent to the at least one skill group; and
sending the message pertinent to the at least one agent.

6. The method of claim 1, wherein the password vault comprises at least one hidden password for logging into the at least one agent application.

7. The method of claim 1, wherein the at least one skill group comprises at least one agent possessing a set of skills required for a task.

8. The method of claim 1 comprising logging the agent into at least one agent application using the at least one hidden password.

9. The method of claim 1, wherein the message is customized for at least one of the at least one skill group and the agent.

10. A system, comprising:
a communication server communicably coupled to the at least one system;
a database communicably coupled to the communication server;
an application communicably coupled to the communication server and the database, the application comprising a password vault; and
at least one agent application communicably coupled to the application,
the application operable to login at least one agent into the at least one agent application utilizing at least one hidden password in the password vault, retrieve information of the at least one agent from the database, retrieve at least one skill group to which the at least one agent belongs from the information, retrieve a message linked to the at least one skill group, and send the message to the at least one agent, wherein the agent belonging to the skill group is based on a matching of a skill set of the at least one agent against a set of skills required by at least one task assigned to skill group and wherein the message is associated with the at least one task and wherein one of in addition to and alternative to utilizing the password vault and the at least one hidden password to authenticate the agent, authentication is performed based on licensed available seat name.

11. The system of claim 10, wherein the application is further operable to input a local password by the at least one agent, access the password vault with the local password, retrieve at least one hidden password from the password vault, and log the at least one agent into at least one agent application using the at least one hidden password.

12. The system of claim 10, wherein the application is further operable to subscribe the at least one agent to the at least one skill group based on the at least one skill set possessed by the at least one agent, and store the at least one skill group of the at least one agent in the database.

13. The system of claim 10, wherein the application is further operable to locate at least one skill group required for a task, locate at least one agent belonging to the at least one skill group, retrieve a message pertinent to the at least one skill group, and send the message pertinent to the at least one agent.

14. The system of claim 10, wherein the wherein the message comprises at least one of a message indicating a new product has become available for the at least one task, a message indicating a new training is required for the at least one task, a message indicating a new schedule for the at least one task has become available, a message indicating additional information about the at least one task, and an urgent need for an agent is available for the at least one task.

15. The system of claim 10, wherein information of the at least one agent comprises the set of skills possessed by the at least one agent and the at least one skill group to which the at least one agent belongs.

16. The system of claim 10, wherein the at least one skill group comprises at least one agent possessing a set of skills required for a task.

17. A non-transitory computer readable storage medium comprising instructions executable in at least one processor comprising instructions for:
accessing a password vault with a local password associated with an agent;
retrieving at least one hidden password from the password vault; and
determining a message for the agent from at least one agent application based on a subscription of the agent to at least one skill group wherein subscription is based on a matching of a skill set of the agent against a set of skills required by at least one task assigned to skill group and wherein the message is associated with the at least one task wherein one of in addition to and alternative to utilizing the password vault and the at least one hidden password to authenticate the agent, authentication is performed based on licensed available seat name.

18. The non-transitory computer readable storage of claim 17, further comprising instructions for:
retrieving information of the agent from a database;
retrieving at least one skill group to which the agent belongs from the information;
retrieving a message linked to the at least one skill group; and
sending the message to the agent.

19. The non-transitory computer readable storage of claim 18, further comprising instructions for customizing the message for at least one of the at least one skill group and the agent.

20. The non-transitory computer readable storage of claim 17, wherein the message comprises at least one of a message indicating a new product has become available for the at least one task, a message indicating a new training is required for the at least one task, a message indicating a new schedule for the at least one task has become available, a message indicating additional information about the at least one task, and an urgent need for an agent is available for the at least one task.

\* \* \* \* \*